April 3, 1945. O. J. HUELSTER Re. 22,626

ONE-WAY SNAP FASTENER

Original Filed March 30, 1942

INVENTOR
OTTO J. HUELSTER
BY
Howard L. Thompson
ATTORNEY

Reissued Apr. 3, 1945 Re. 22,626

UNITED STATES PATENT OFFICE 22,626

ONE-WAY SNAP FASTENER

Otto J. Huelster, Waterbury, Conn., assignor to Scovill Manufacturing Company, Waterbury, Conn., a corporation of Connecticut Original No. 2,328,016, dated August 31, 1943, Serial No. 436,728, March 30, 1942. Reissue application April 26, 1944, Serial No. 532,895. Divided and this application for reissue February 9, 1945, Serial No. 577,001

2 Claims. (Cl. 24—218)

This specification constitutes a division of reissue application Serial Number 532,895, filed April 26, 1944.

This invention relates to snap fasteners, and more particularly to improvements in that class of device of which the component socket or stud members may be detached one from another only by the application of a pull in one particular direction.

The object of the invention is to provide a snap fastener stud member which may be disengaged from a socket of the foregoing character more easily than can a stud of conventional design; and, more specifically, to provide a stud having its head deformed from the truly circular shape of a conventional stud in such a way as to facilitate its separation from the one-way detachable socket of the invention in response to a pull applied to the fastened members at the one proper place.

The foregoing and other objects of the invention, as well as various features thereof, will be more apparent from the following description when considered in the light of the accompanying drawing, in which—

Figure 1:
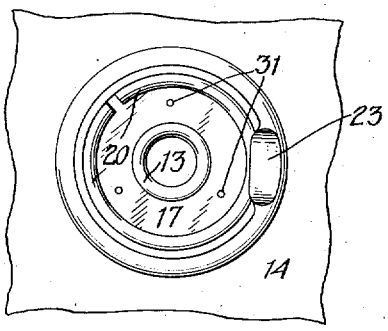
Figure 1 is a plan view of a socket member constructed in accordance with the invention and secured to a supporting sheet.

In the embodiment of the invention shown in Figs. 1 to 4, the body 10 of the socket is preferably a one-piece sheet-metal shell comprising a crown portion 11 having a central opening 12 for receiving the end of a rivet 13 by which the body is secured to a supporting sheet 14; a back flange 15 extending more or less abruptly outward from the margin of the crown; and a peripheral wall 16 extending forwardly from the back flange, these various portions forming collectively a recess 17 for receiving the head of a stud member 18, which is here shown installed upon a second supporting sheet 19. The spring element of the assembly is preferably a simple split ring 20 located in the stud-receiving recess 17 where it may engage the contracted neck portion 21 of the stud to hold that member and the socket in fastened relation. In accordance with the invention, the recess 17 is somewhat larger at its rear than at its forward end, whereby the spring element may have some backward and forward movement therein. This is very simply accomplished in the preferred embodiment by tapering the wall 16 inwardly from its juncture with the back flange 15 toward its mouth 22, although any other suitable expedient may be adapted to accomplish the desired result. It is also of importance to note that a portion of the spring ring is always confined within the enlarged rear end of the stud-receiving recess of the socket. Thus in Figs. 1 to 4 the mouth of the shell is inturned as shown to provide a lip 23 which is adapted to hold the adjacent sector of the ring within the enlarged rear end of the stud-receiving recess 17 while allowing its remaining portions to axially tilt with respect to the shell forwardly or backwardly in the manner heretofore mentioned.

Figure 3:
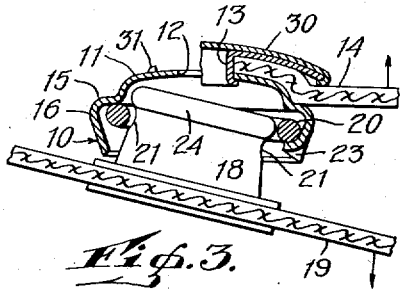
Figs. 2 and 3 are sectional views of the socket of Fig. 1 illustrating its detachment from a conventional stud member in response to a separating pull applied at the one proper place.
Figure 2:
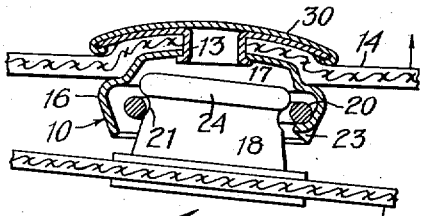

The above-described socket may be snapped into engagement with a cooperating stud 18 in the usual way, and this operation is so readily evident as to require neither specific illustration nor description. The constructional features of the socket are such, however, that it cannot be disengaged from the stud except by the application of a pull to the fastened supporting sheets 14 and 19 at one particular place. The separating operation is illustrated in Figs. 2 and 3, where it will be observed that a pull upon the sheets immediately above and below the inturned lip 23, as indicated by the arrows, has the effect of tilting the socket and the stud relative to each other in such a way that the entire spring ring 20 then lies within the enlarged rear portion of the body immediately adjacent the back flange 15. With the parts of the fastened installation in these relative positions, a slight additional pull upon the sheets will cause lip 23 to lift the right-hand portion of the ring and expand it over the head of the stud to release that element, as is clearly shown in Fig. 3.

Figure 4:
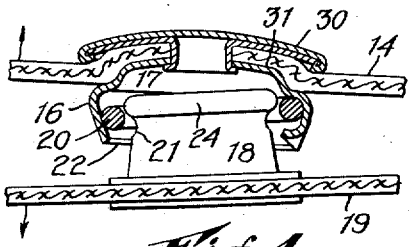
Fig. 4 is a sectional view, similar to that of Figs. 2 and 3, illustrating the manner in which in which the socket locks with its cooperating stud to prevent separation of one member from the other when the sheets on which the members are installed are pulled in any but the one desired direction.

The effect of the application of a separating force to the fastened socket and stud at any but the one proper place, is illustrated in Fig. 4. There the pull upon the fastened sheets has the effect of tilting the socket and stud in such a way as to cause ring 20 to lie in a constricted part of the stud-receiving recess 17 with its entire periphery engaged by the tapered wall 16. When the parts of the fastened members are in these relative positions it is apparent that ring 20 is not free to expand for the purpose of releasing the head of the stud, and continued pulling of the sheets not only fails of that result, but, on the contrary, can only cause the tapered wall of the shell to bind more firmly against the ring and tighten the hold of that element upon the said head. In order to simplify illustration the pull upon the sheets has been indicated as applied at points diametrically opposite the inturned lip 23 of the socket. It will be evident, however, that the application of a pull to the fastened sheets at any other point along the peripheries of the members except at the one proper opening place will lock the socket upon the stud in the manner just described. Thus, a pull upon the fastened members will always tilt them to such relative positions as to cause the tapered wall of the body 10 to confine the ring 20 and wedge it against the head of the stud 18 whereby to prevent separation of one member from the other, unless that pull is applied at points immediately over and under the inturned lip 23.

Figure 5:
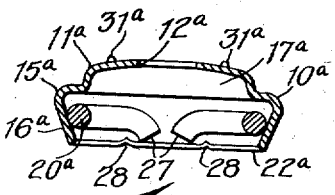
Figs. 5 and 6 are sectional views illustrating another form of socket embodying the invention, the section of the separate figures being taken at 90° to each other.
Figure 6:
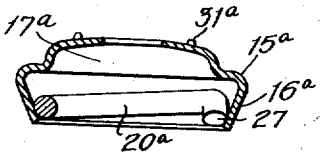

Another form of socket embodying the invention is illustrated in Figs. 5 and 6, where, for the sake of simplicity, the body portion 10*a* is again a simple sheet-metal shell having a crown 11*a* with a central rivet-receiving opening 12*a*, and a back flange 15*a*; and its stud-receiving recess 17*a* is again constricted by having its peripheral wall 16*a* tapered inwardly—the shell in these respects being substantially identical with that of the embodiment of Figs. 1 to 4. In this arrangement, however, the means for holding the spring ring 20*a* in the desired position are formed on the ring rather than on the shell. Thus, the ends 27 of the split ring are turned downwardly, as is shown in Fig. 5, and rest upon the tapered wall of the shell so that the adjacent sectors of the ring are held in the enlarged rear end of the stud-receiving recess while all of its other portions are free to move backwards and forwards therein. The functioning of this device is precisely like that of the one already described. When, for example, a pair of sheets which are fastened together by a socket of this kind and a conventional stud member, are pulled at points immediately above and below the downturned ends of the ring 20*a*, that ring will expand and release the stud just as does the ring of the device of Figs. 2–3. If, however, the pull is applied to the sheets at any but the one proper place, the tapered wall 16*a* of the shell will engage and confine the ring 20*a* so that it cannot expand to release the stud, just as was described in connection with the device illustrated in Fig. 4.

In this form of the invention it is essential that the downturned ends of ring 20*a* be maintained in some definite position in the shell, so that the place for the application of a separating pull to the socket may always be determinate. This is accomplished in the illustrated device by indenting the mouth of the shell to provide a pair of internal lips 28 which are adapted to engage the ends of the ring and hold them in a definite position, although any other suitable expedient may be adopted to achieve the desired result.

Figure 7:
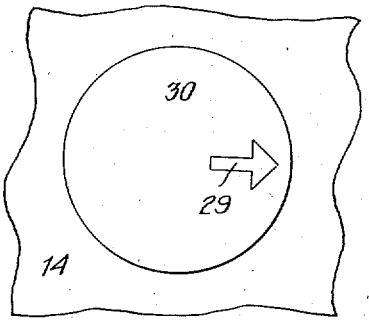
Fig. 7 is a plan view of a fragment of the socket assembly of Figs. 1 to 4, inclusive, looking downwardly from the top thereof.

It will be evident that in the completed installation the one-way limiting means on the socket—namely, the lip 23 of Figs. 1 to 4, or the downturned ends 27 of the ring and the internal lips 28 of Figs. 5 and 6—must be held in a definite relation to the supporting sheet, and the same thing is true of the index mark 29 on the attaching cap 30 (Fig. 7) which indicates the point of application of a separating pull. Thus in both illustrated modifications the crown of the socket and the underside of the cap are provided with a series of tines 31 which are adapted to dig into the supporting sheet 14 and thus to hold the socket and cap against rotation on the sheet.

In both of the illustrated embodiments of the socket, its body is a sheet-metal shell which is adapted to be riveted to its supporting sheet, and the spring element is a conventional split ring. While these embodiments have much to commend them in the matter of simplicity and cheapness of manufacture, it will be evident that the invention may be embodied in other forms. It is only necessary that the body have some means whereby it may be secured to a supporting sheet; that the spring means, whatever its character, shall be mounted for limited back and forth movement in the stud-receiving recess; that the recess shall have an enlarged rear portion within which the spring may expand and a constricted portion adjacent its mouth which is too small to allow sufficient expansion of the spring to release the head of a cooperating stud, and, finally means for holding a portion of the ring within the enlarged rear part of the recess where it may always expand in response to a pull applied immediately above that point.

The socket of the invention may be combined with a conventional form of stud, as is shown in Figs. 2 to 4, inclusive, to provide a one-way detachable snap fastener, as heretofore described. It is of note, however, that the separating action of this combination may be fairly stiff, that is to say, a fairly heavy pull may sometimes be required to snap the truly circular head 24 of the conventional stud through ring 20 of the socket in order to release one member from the other. If a softer-acting fastener is wanted it may readily be gotten by employing a stud of the type shown in Fig. 8 with the socket heretofore described. In that figure, which is on a very much enlarged scale, it will be observed that the head 24*a* is flattened or relieved to a very slight extent at each side of that one of its sectors which is intended to underlie the one-way opening means, i. e., lip 23 of Figs. 1 to 4 or the downturned ends 27 of Figs. 5 and 6. Preferably the stud is of standard construction, and its head is deformed in such a way as to form a portion 32 which projects slightly beyond a true circle having its center coincident with that of the stud head, whereas the immediately adjacent portions 33 are drawn back equally slightly inside of that theoretical circle. This deformation is so slight as to make no difference in the snapping of the stud into engagement with its socket in the ordinary fashion. It will be apparent, however, that when the projecting portion 32 of the stud head is aligned with the one-way limiting means of the socket, the lip 23, for example, the relieved sectors 33 will be able to pass through the ring 20 more easily than would the comparable, truly circular sectors of a conventional head—that is to say, the split ring of the socket will not have as much frictional engagement in the release of the relieved head of the Fig. 8 stud as it would to pass over the circular head of a conventional member. While this deformed head facilitates release of the socket from its stud in response to a properly applied separating pull, it will also be evident that neither the projecting portion 32 nor the relieved sector 33 will prevent the binding and locking together of the members when a pull is applied to them at any point other than immediately over and under the one-way limiting means of the socket, i. e., lip 23 or downturned ends 27.

Figure 8:
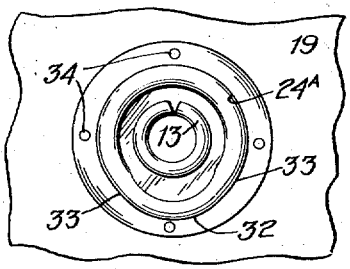
Fig. 8 is a plan view of the stud element of the present invention which is designed for use with the illustrated sockets.

It will be apparent from the foregoing that the stud member of Fig. 8 must be installed upon its supporting sheet with the projecting portion 32 of its head so disposed that it will underlie the one-way limiting means of a cooperating socket when the members are mutually engaged. In order that this established relationship may not be disturbed, the base of the stud preferably has a series of tines 34 which are adapted to dig into the supporting sheet during the setting of the stud so that they may hold the stud against rotation in its normal usage.

Since the invention is capable of embodiment in various forms, it is intended that the foregoing shall be construed in a description rather than a limiting sense.

What I claim is:

1. A stud member comprising a base adapted to be secured to a supporting sheet, and a central upstanding post having an enlarged head and a contracted neck lying immediately behind said head, said head being of substantially circular cross section and having two adjoining sectors with their outer surfaces lying slightly inside of a circle drawn from the center of the post and coinciding with substantially all other parts of the head.

2. A stud member comprising a base which is adapted to be secured to a supporting sheet, and a central upstanding post having an enlarged head and a contracted neck lying immediately behind said head, said head having one sector which projects slightly beyond a true circle drawn from the center of the post, and a sector at each side of such projecting portion which lies slightly inside of such circle.

OTTO J. HUELSTER.